US010551510B2

(12) United States Patent
Sakumura et al.

(10) Patent No.: US 10,551,510 B2
(45) Date of Patent: Feb. 4, 2020

(54) DATA PROCESSING APPARATUS, METHOD OF OBTAINING CHARACTERISTIC OF EACH PIXEL AND METHOD OF DATA PROCESSING, AND PROGRAM

(71) Applicant: RIGAKU CORPORATION, Akishima-shi, Tokyo (JP)

(72) Inventors: Takuto Sakumura, Hachioji (JP); Yasukazu Nakaye, Ome (JP); Yuji Tsuji, Hamura (JP); Koichi Kajiyoshi, Ome (JP); Takeyoshi Taguchi, Tachikawa (JP); Kazuyuki Matsushita, Ome (JP)

(73) Assignee: RIGAKU CORPORATION, Tokyo (JP)

( * ) Notice: Subject to any disclaimer, the term of this patent is extended or adjusted under 35 U.S.C. 154(b) by 333 days.

(21) Appl. No.: 15/516,777

(22) PCT Filed: Jul. 10, 2015

(86) PCT No.: PCT/JP2015/069924
§ 371 (c)(1),
(2) Date: Apr. 4, 2017

(87) PCT Pub. No.: WO2016/063586
PCT Pub. Date: Apr. 28, 2016

(65) Prior Publication Data
US 2018/0203132 A1    Jul. 19, 2018

(30) Foreign Application Priority Data

Oct. 24, 2014   (JP) .................................. 2014-217751

(51) Int. Cl.
*G01T 1/17*    (2006.01)

(52) U.S. Cl.
CPC ...................................... *G01T 1/17* (2013.01)

(58) Field of Classification Search
CPC . G06T 2207/10081; G06T 2207/10116; G01T 7/005; G01T 1/36; G01N 23/083
(Continued)

(56) References Cited

U.S. PATENT DOCUMENTS 4,992,706 A * 2/1991 Troemel ............... H04N 3/2335
                                                              315/368.12
5,272,536 A   12/1993 Sudo et al.
(Continued)

FOREIGN PATENT DOCUMENTS

JP       53-66778 A    6/1978
JP       2002-593 A    1/2002
(Continued)

*Primary Examiner* — John E Breene
*Assistant Examiner* — Jeffrey P Aiello
(74) *Attorney, Agent, or Firm* — Birch, Stewart, Kolasch & Birch, LLP

(57) ABSTRACT

Provided are a data processing apparatus a method of obtaining the characteristic of each pixel and a method of data processing, and a program. A data processing apparatus 100 to correct X-ray intensity data measured by a pixel detector includes a characteristic storage unit 130 to store the characteristic of each pixel in a specific detector, a correction table generation unit 120 to apply a measurement condition input as that in measurement by a specific detector and a value expressing the characteristic of each pixel to an approximate formula expressing the count value of each pixel and to generate a correction table for the specific detector using the calculation result of the approximate formula, and a correction unit 160 to correct the X-ray intensity data measured by the specific detector using the generated correction table.

10 Claims, 14 Drawing Sheets

(58) Field of Classification Search
USPC ..... 250/208.1, 370.09; 378/207; 702/40, 81, 702/85
See application file for complete search history.

(56) References Cited

U.S. PATENT DOCUMENTS

| | | | | |
|---|---|---|---|---|
| 6,134,292 | A * | 10/2000 | Hsieh | A61B 6/032 378/19 |
| 6,476,394 | B1 * | 11/2002 | Amitani | G01T 1/2018 250/368 |
| 6,694,172 | B1 * | 2/2004 | Gagnon | G01T 1/2928 250/363.02 |
| 6,792,159 | B1 | 9/2004 | Aufrichtig et al. | |
| 7,136,454 | B2 | 11/2006 | Gerndt et al. | |
| 8,618,491 | B2 * | 12/2013 | Shimizukawa | A61B 6/4233 250/370.09 |
| 2005/0259790 | A1 | 11/2005 | Gerndt et al. | |
| 2012/0326049 | A1 * | 12/2012 | Hannemann | G01T 1/243 250/394 |
| 2014/0236523 | A1 * | 8/2014 | Matsushita | G01T 1/2914 702/104 |
| 2014/0348300 | A1 * | 11/2014 | Lee | H04N 5/32 378/98.2 |
| 2015/0085970 | A1 * | 3/2015 | Bouhnik | A61B 6/4241 378/5 |
| 2018/0203132 | A1 * | 7/2018 | Sakumura | G01T 1/16 |

FOREIGN PATENT DOCUMENTS

| | | |
|---|---|---|
| JP | 2008-167846 A | 7/2008 |
| JP | 2010-74641 A | 4/2010 |
| JP | 2011-180095 A | 9/2011 |
| WO | WO 03/001243 A2 | 1/2003 |
| WO | WO 03/001243 A3 | 1/2003 |
| WO | WO 2007/125691 A1 | 11/2007 |

* cited by examiner

Bad Pixel TABLE

Bad Pixel

CORRECTION

E.G., INTENSITY COMPLEMENTATION BY 8 PIXELS NEAR Bad Pixel (BLACK PIXEL)

DATA PROCESSING APPARATUS, METHOD OF OBTAINING CHARACTERISTIC OF EACH PIXEL AND METHOD OF DATA PROCESSING, AND PROGRAM

TECHNICAL FIELD

The present invention relates to a data processing apparatus to correct X-ray intensity data measured by a pixel detector, a method of obtaining characteristic of each pixel and a method of data processing, and a program.

BACKGROUND ART

In recent years, a semiconductor detector of a photon counting type has been used for X-ray intensity measurement. In such a detector, each pixel (including a strip) has an individual characteristic, and difference in gain, behavior, or sensitivity is generated among pixels and individual variation appears even when each pixel is uniformly irradiated with a X-ray (refer to Patent Literature 1, for example).

Accordingly, an apparatus maker irradiates a detector with a uniform X-ray having a certain intensity before shipping a measurement apparatus, and thereby prepares a correction table to correct difference in a pixel gain or a count value among pixels (Flat-Field correction) according to a specific measurement condition, prepares a correction table to eliminate a bad pixel, or prepares a versatile table which can be used in some measurement conditions (refer to Patent Literatures 2 and 3, for example). FIG. 13 and FIG. 14 schematically show examples of the correction tables for the Flat-Field correction and correction for eliminating a bad pixel, respectively. Conventionally, a set of such correction tables is used for the correction.

PRIOR ART LITERATURE

Patent Literature

Patent Literature 1: U.S. Unexamined Patent Application Publication No. 2005/0259790
Patent Literature 2: Publication of U.S. Pat. No. 6,792,159
Patent Literature 3: Publication of U.S. Pat. No. 5,272,536

DISCLOSURE OF THE INVENTION

Problem to be Solved by the Invention

However, the set of correction tables as described above can be used only under a condition assumed in the adjustment. Then, even a normal pixel at a glance sometimes generates noise when exposed for a long time, or the correction value thereof is shifted sometimes when an X-ray having a count value significantly different from that in the Flat-Field correction is made to enter. In this manner, when measurement is desired to be performed in a condition different from that in the initial assumption, the apparatus maker side needs to take back the apparatus to prepare a correction table again.

For example, use temperature is set for the measurement apparatus and the allowable temperature range is assumed to be ±10° C. of the use temperature, and data is guaranteed if the apparatus is used in this range. When desired to be used at a temperature deviated from the guarantee range by 15° C. or more, the measurement apparatus is brought into the apparatus maker and the correction table is adjusted. When, in addition to such a change of the use environment temperature caused by the change of an installation site or the like, the kind of an X-ray source, the energy (wavelength) of an X-ray tube, an energy threshold value in measurement, or the like changes from the assumption at shipment, a new table becomes necessary.

Further, variation exists even within the allowable temperature range of the specification, and sometimes a larger number of complementary pixels are set so as to neglect the variation or to allow usage within the whole range. When a table is prepared assuming a bad pixel caused in any of the conditions as a consistent bad pixel, the image does not have any problem, but it is inefficient that the X-ray intensities of pixels more than required are not used when the table is used. In this manner, it is necessary to prepare a table which can be used as much as possible in the range of the condition, by an inefficient greatest common divisor approach.

The present invention has been achieved in view of such a situation and has an object to provide a data processing apparatus that saves a trouble of setting a correction table again and enables a user to measure X-ray intensity data quickly under a desired condition, a method of obtaining the characteristic of each pixel and a method of data processing, and a program.

Means for Solving the Problem (1) For achieving the above object, a data processing apparatus of the present invention is a data processing apparatus that corrects X-ray intensity data measured by a pixel detector, including: a characteristic storage unit to store a characteristic of each pixel in a specific detector; a correction table generation unit to apply a measurement condition input as that in measurement by the specific detector, and a value expressing the characteristic of each pixel to an approximate formula expressing a count value of the each pixel and to generate a correction table for the specific detector using a calculation result of the approximate formula; and a correction unit to correct X-ray intensity data measured by the specific detector using the generated correction table.

In this manner, the data processing apparatus of the present invention generates the correction table according to the input measurement condition, and thereby it is possible to change a measurement condition without setting a correction table again by taking back a measurement apparatus to an apparatus maker. As a result, a user can measure the X-ray intensity data quickly under a desired condition.

(2) Further, in the data processing apparatus of the present invention, the correction table generation unit uses a formula obtained by adding a formula expressing a primary count amount by X-ray irradiation and a formula expressing a count amount by charge sharing, as the approximate formula expressing the count value of each pixel. Thereby, it is possible to generate the correction table referring to the influence of the charge sharing.

(3) Further, in the data processing apparatus of the present invention, the correction table generation unit uses a formula obtained by adding a formula expressing a count amount by noise and a formula expressing a count amount by other than the noise, as the approximate formula expressing the primary count amount by the X-ray irradiation. Thereby, it is possible to measure the X-ray intensity avoiding the noise. In addition, it is possible to set a complementary pixel efficiently by referring to the influence of the noise according to the measurement condition.

(4) Further, in the data processing apparatus of the present invention, the correction table generation unit calculates a correction coefficient for Flat-Field correction or distortion correction for each pixel using a calculation result of the approximate formula expressing the count value of each pixel. Thereby, it is possible to perform the Flat-Field correction or the distortion correction according to the measurement condition.

(5) Further, in the data processing apparatus of the present invention, the correction table generation unit specifies a bad pixel using a calculation result of the approximate formula expressing the count value of each pixel and a threshold value of the count value, and calculates a correction coefficient for complementing the bad pixel. Thereby, it is possible to set a complementary pixel efficiently according to the measurement condition. As a result, it becomes unnecessary to set the complementary pixel again by taking back the measurement apparatus every time the measurement condition is changed, and it becomes also unnecessary to set the complementary pixel uniformly for a plurality of conditions.

(6) Further, in the data processing apparatus of the present invention, the input measurement condition in the measurement includes temperature around a measurement apparatus. Thereby, it is possible to correct the X-ray intensity data using a correction table referring to the influence of the temperature such as noise shift caused according to the temperature in the measurement.

(7) Further, in the data processing apparatus of the present invention, the input measurement condition in the measurement includes a kind of an X-ray source used for the measurement. Thereby, when the X-ray source is changed, it is possible to correct the X-ray intensity data using a correction table which is generated quickly according to an X-ray source to be used.

(8) Further, a method of the present invention is a method of obtaining the characteristic of each pixel stored in the data processing apparatus, including the steps of: uniformly irradiating the specific detector with an X-ray while changing a specific measurement condition, and recording a detection value of each pixel; and calculating a characteristic of each pixel from the recorded detection value of each pixel. Thereby, it is possible to store the characteristic of each pixel in the data processing apparatus and correct the X-ray intensity data using a correction table derived from the characteristic of each pixel according to a desired measurement condition.

(9) Further, a method of the present invention is a method of data processing for correcting X-ray intensity data measured by a pixel detector, including the steps of: applying a measurement condition input as that in measurement by a specific detector and a preliminarily stored value expressing a characteristic of each pixel in a specific detector to an approximate formula expressing a count value of the each pixel and generating a correction table for the specific detector using a calculation result of the approximate formula expressing the count value of each pixel; and correcting X-ray intensity data measured by the specific detector using the generated correction table. Thereby, a user can measure the X-ray intensity data quickly under a desired condition.

(10) Further, a program of the present invention is a program of data processing program for correcting X-ray intensity data measured by a pixel detector, causing a computer to execute the processes of: applying a measurement condition input as that in measurement by a specific detector and a preliminarily stored value expressing a characteristic of each pixel in a specific detector to an approximate formula expressing a count value of the each pixel and generating a correction table for the specific detector using a calculation result of the approximate formula expressing the count value of each pixel; and correcting X-ray intensity data measured by the specific detector using the generated correction table. Thereby, a user can measure the X-ray intensity data quickly under a desired condition.

Advantageous Effect of the Invention

According to the present invention, it is possible to save a trouble of setting a correction table again, and to allow a user to measure X-ray intensity data quickly under a desired condition.

BEST MODES FOR CARRYING OUT THE INVENTION

Figure 1:
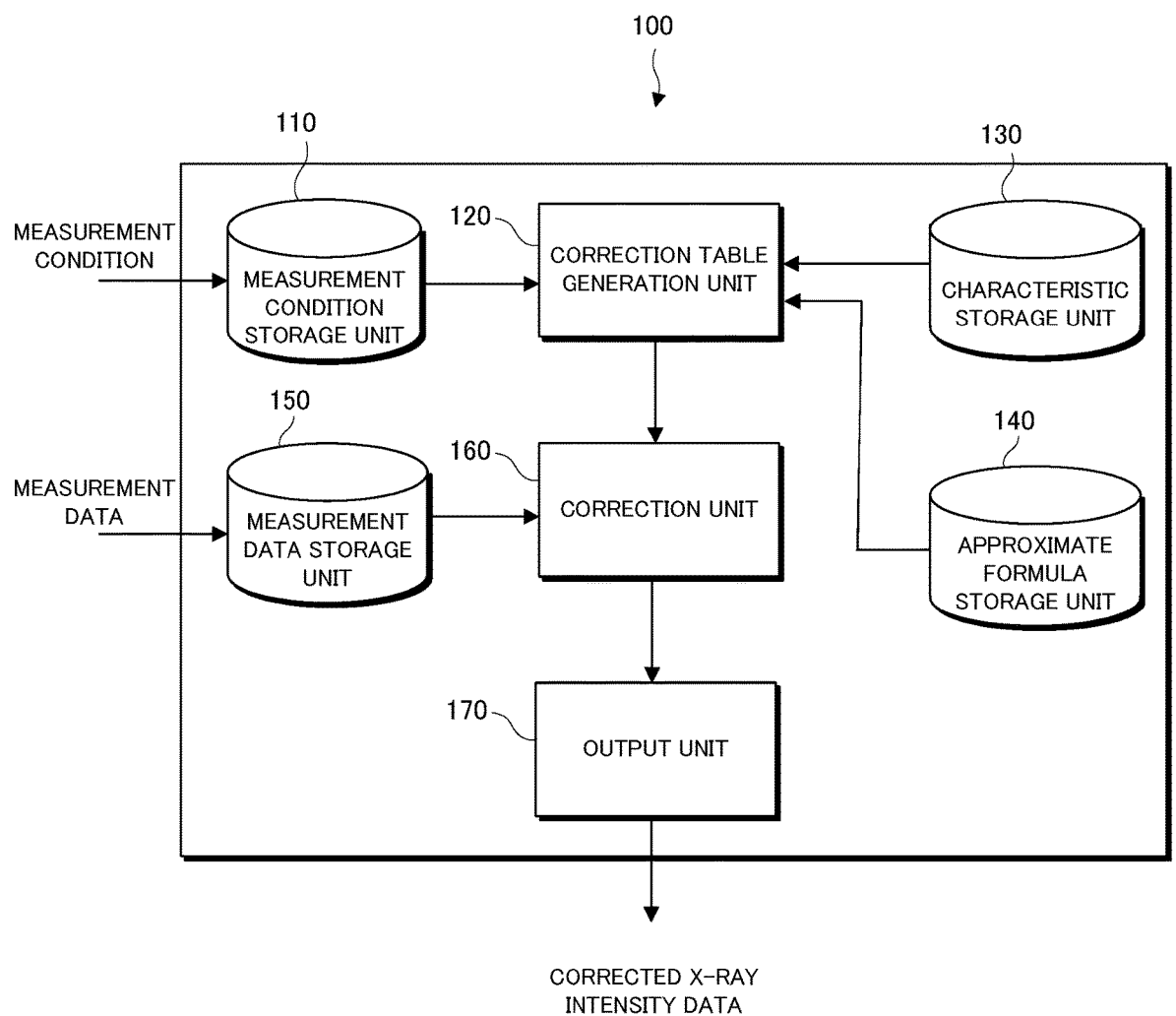
FIG. 1 is a block diagram showing a configuration of a data processing apparatus of the present invention.

Next, an embodiment of the present invention will be explained with reference to the drawings. For easy understanding of the explanation, the same reference numeral is attached to the same element in each of the drawings and duplicated explanation will be omitted.

(Configuration of Data Processing Apparatus)

FIG. 1 is a block diagram showing a configuration of a data processing apparatus 100. For example, the data processing apparatus 100 is configured with a PC and connected to a measurement apparatus. As shown in FIG. 1, the data processing apparatus 100 includes a measurement condition storage unit 110, a correction table generation unit 120, a characteristic storage unit 130, an approximate formula storage unit 140, a measurement data storage unit 150, a correction unit 160, and an output unit 170, and corrects X-ray intensity data measured by a detector. The detector is a one-dimensional or two-dimensional detector having a spatial minimum unit of a pixel (including a strip), and counts photons while removing noise of an electronic circuit using a threshold value.

The measurement condition storage unit 110 stores an input measurement condition in measurement. The input may be performed automatically from the measurement apparatus, or may be performed manually by a user. For example, the input measurement condition in the measurement includes temperature around the measurement apparatus. Thereby, it is possible to correct the X-ray intensity data with reference to the influence of the temperature such as noise shift caused according to the temperature in the measurement. Further, the measurement condition in the measurement may be the kind of the X-ray source. As a result, also when the X-ray source is changed, it is possible to correct the X-ray intensity data quickly depending on the X-ray source. In addition, the measurement condition in the measurement may include atmospheric pressure or humidity.

The correction table generation unit 120 applies the measurement condition input as that in the measurement by the detector and a value expressing a characteristic of each pixel to an approximate formula expressing a count value of each pixel, and generates a correction table for the detector using the calculation result of the approximate formula. Thereby, it is possible to change the measurement condition without taking back the measurement apparatus to an apparatus maker to set a correction table again. As a result, a user can measure the X-ray intensity data quickly under a desired condition.

Here, in the present embodiment, the detector to detect the X-ray intensity has the same pixel characteristic as a detector used for the generation of the correction table (specific detector), and the detected X-ray intensity is corrected by the use of the correction table.

The correction table generation unit 120 uses a formula obtained by adding a formula expressing a primary count amount by the X-ray irradiation and a formula expressing a count amount by charge sharing, as the approximate formula expressing a count value of each pixel. Furthermore, the approximate formula expressing the primary count amount by the X-ray irradiation is a formula obtained by adding a formula expressing a count amount by noise and a formula expressing a count amount by other than the noise. Thereby, it is possible to eliminate the count amount by the noise and also to measure the X-ray intensity reflecting the influence of the charge sharing. Further, it is possible to set a complementary pixel efficiently with reference to the influence of the noise.

The correction table generation unit 120 calculates a correction coefficient of each pixel for Flat-Field correction or distortion correction using the calculation result of the approximate formula. Thereby, it is possible to perform the Flat-Field correction or the distortion correction according to the measurement condition.

The correction table generation unit 120 specifies a complementary pixel using the calculation result of the approximate formula and a threshold value of the count value, and calculates a correction coefficient for complementing the complementary pixel. Thereby, it is possible to set a complementary pixel efficiently according to the measurement condition. As a result, it becomes unnecessary to take back the measurement apparatus and to set the complementary pixel again every time the measurement condition is changed, and it becomes also unnecessary to set a complementary pixel uniformly for a plurality of conditions. Here, the complementary pixel indicates a pixel which is a bad pixel whose detection value is not used and a target of pixel value complementation by any method.

The characteristic storage unit 130 stores the characteristic of each pixel in the detector. A method of obtaining the characteristic of each pixel will be described below. The approximate formula storage unit 140 stores the approximate formula to be used in the correction table generation. For the approximate formula, for example, the count amount by the noise can be expressed by a Gaussian function, the count amount by other than the noise in the primary count amount by the X-ray irradiation can be expressed by an error function, and the count amount by the charge sharing can be expressed by a linear function. Details will be described below.

The measurement data storage unit 150 stores measured data. For example, the measured data transmitted from the measurement apparatus is received by the data processing apparatus 100 and stored into the measurement data storage unit 150.

The correction unit 160 corrects the X-ray intensity data measured by the detector using the generated correction table. In the present embodiment, the correction tables are put together into a single table, and the correction can be performed easily using only this correction table. Note that a plurality of tables may be retained and may be used compositely. The output unit 170 outputs the corrected X-ray intensity data.

(Preliminary Preparation Method)

Figure 2:
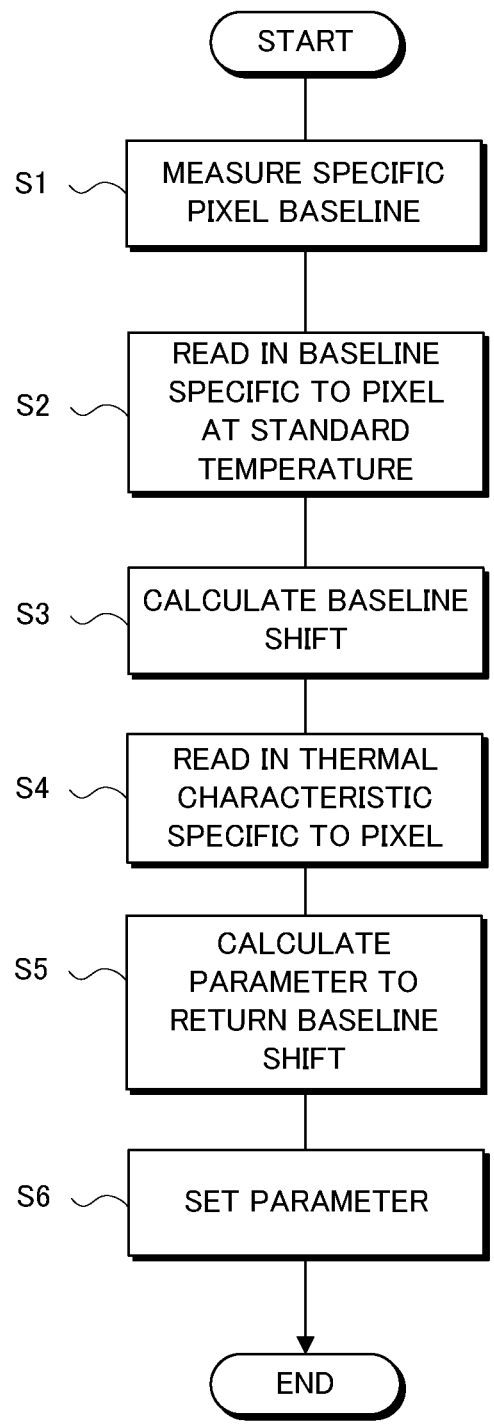
FIG. 2 is a flowchart showing a method of setting characteristic of each pixel in advance.

Next, a method of preliminarily preparing a characteristic for each pixel in the detector will be explained. FIG. 2 is a flowchart showing a method of setting the characteristic of each pixel in advance. First, the detector is irradiated uniformly with the X-ray while the measurement condition is changed, the detection value of each pixel is recorded, and a baseline is measured for each pixel by the use of the recorded detection value (step S1). The baseline is an average value obtained including other pixels, for example.

Next, the baseline specific to a pixel at a standard temperature is read in from the database (step S2), and the shift of the baseline is calculated (step S3). Meanwhile, the thermal characteristic specific to a pixel is read in from the database (step S4), and a parameter (characteristic) to return the baseline shift is calculated (step S5). In this manner, the characteristic of each pixel is calculated from the recorded detection value of each pixel to be used, and the obtained parameter is stored in the characteristic storage unit to be set (step S6). Thereby, it becomes possible to correct the X-ray intensity according to a desired measurement condition using the characteristic of each pixel stored in the data processing apparatus.

(Uniform Irradiation)

Figure 3:
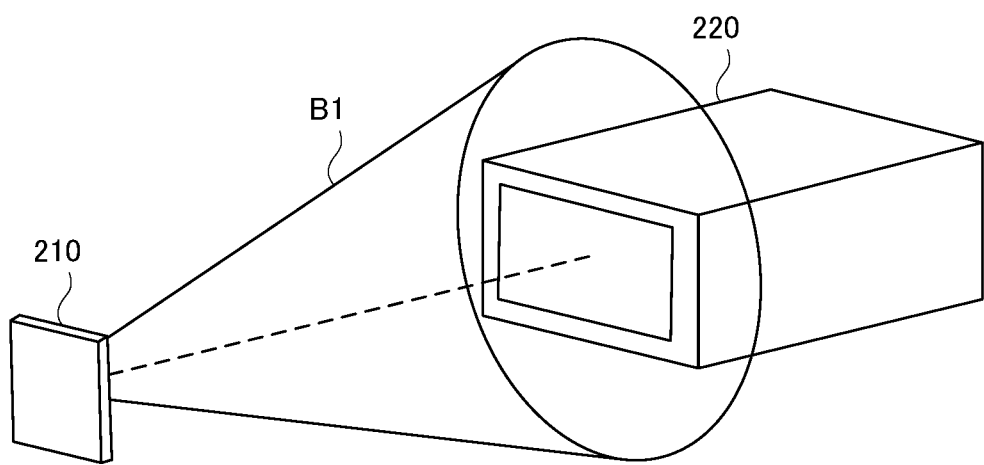
FIG. 3 is a perspective view showing a scene of uniform irradiation to a detector.

The above uniform irradiation will be explained. FIG. 3 is a perspective view of a scene of the uniform irradiation to the detector 220. The uniform irradiation of the X-ray can be performed by means of irradiating the detector 220 with an X-ray beam B1 which is diffused uniformly by a diffusion plate 210 as shown in FIG. 3, for example. In this manner, an integral profile of the X-ray is obtained for each pixel.

Figure 4:
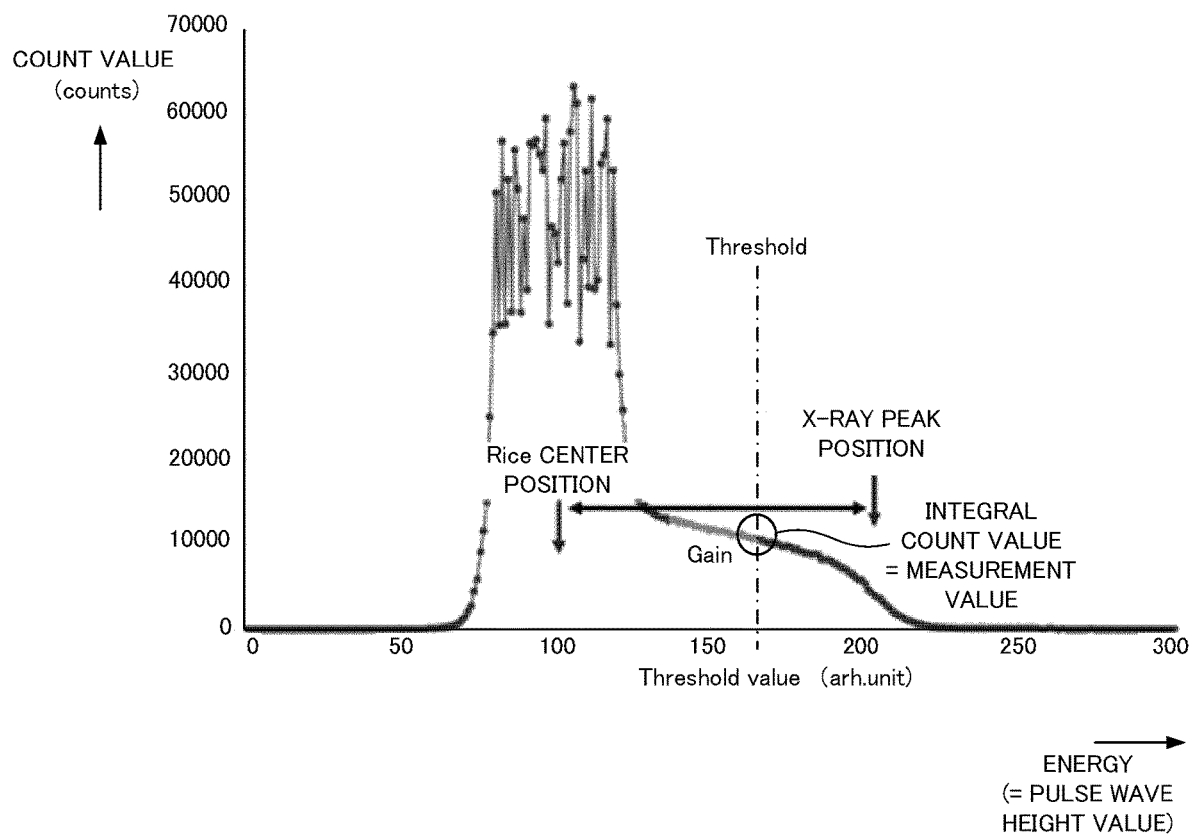
FIG. 4 is a graph showing an X-ray integral profile in one pixel.

FIG. 4 is a graph showing the integral profile of the X-ray in one pixel. The graph of FIG. 4 shows energy in the horizontal axis and a count value in the vertical axis, and shows a count value integrated from the high energy side. Accordingly, the position where the count value increases abruptly indicates a peak position of X-ray energy, and the height of a curve at a threshold value indicates an integral count value. Further, noise appears on the lower energy side having a right-and-left symmetric shape (Rice distribution) in which the upper end is cut out by saturation, and the center position thereof indicates the zero point.

Figure 5:
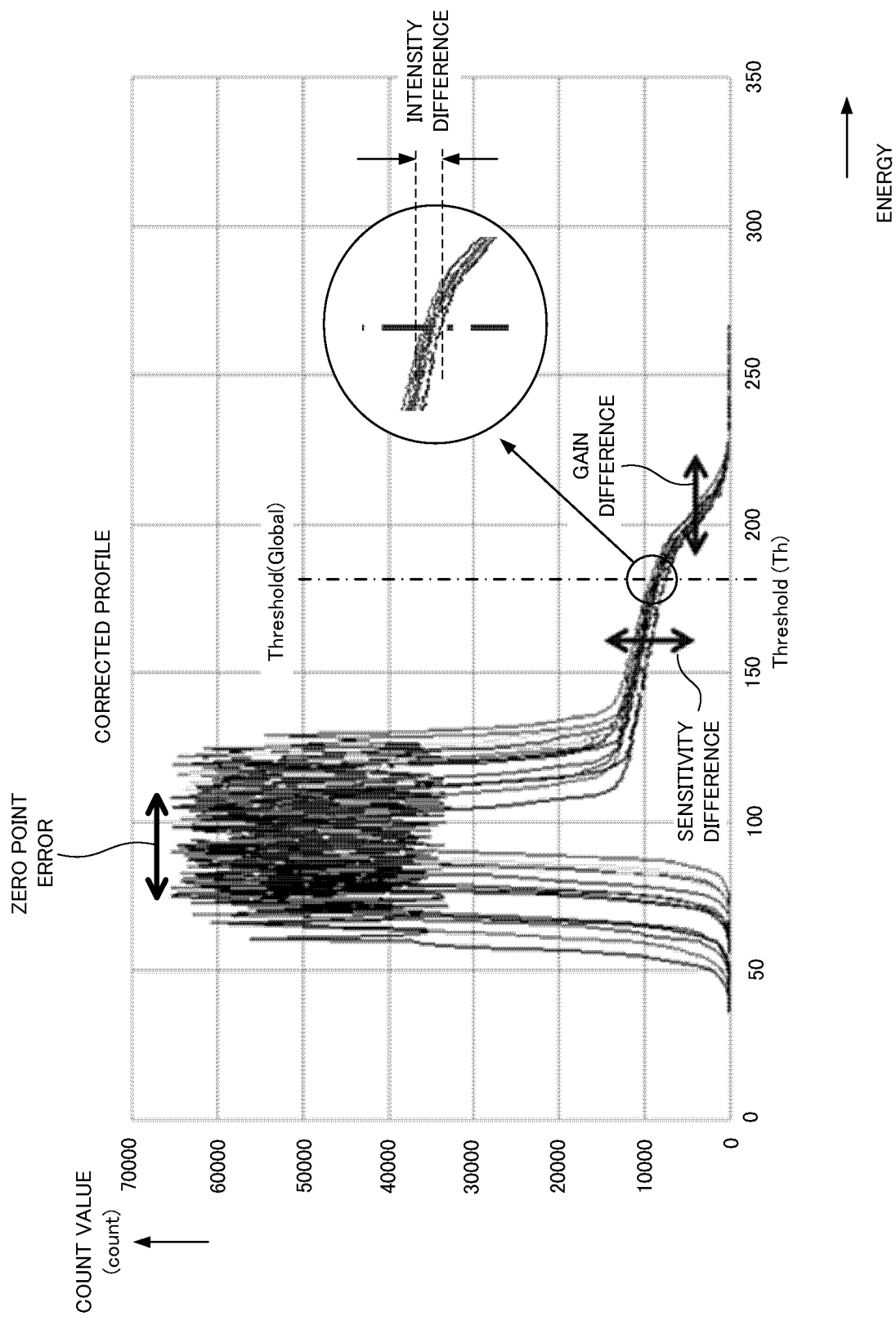
FIG. 5 is a graph showing a corrected X-ray integral profile in a plurality of pixels.

FIG. 5 is a graph showing a corrected X-ray integral profile in a plurality of pixels. The correction reduces sensitivity difference, gain difference, zero point error difference, and the like among the plurality of pixels. In the example shown in FIG. 5, as the result of the correction, the intensity difference in the integral count value among pixels at the threshold value becomes small.

(Action of Data Processing Apparatus)

Figure 6:
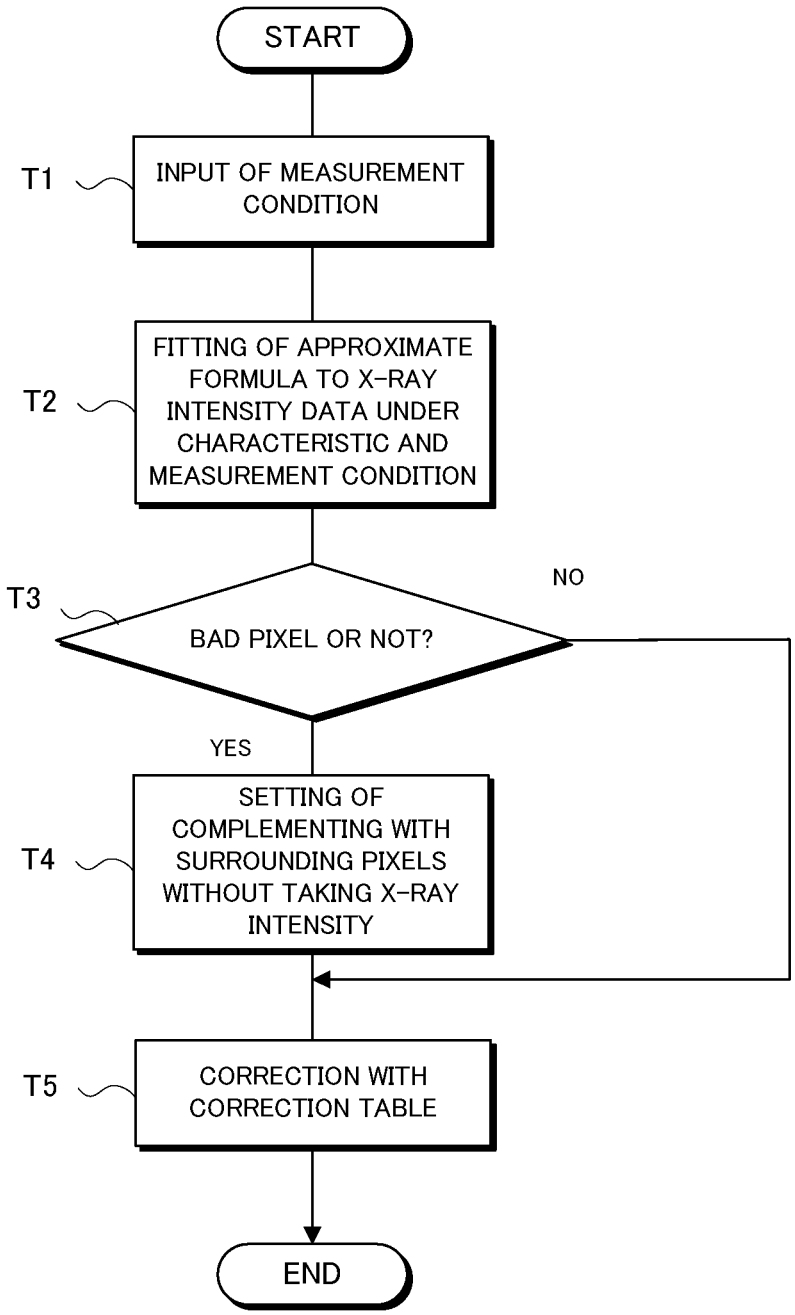
FIG. 6 is a flowchart showing an action of the data processing apparatus of the present invention.

It is possible to prepare the correction table according to the measurement condition using the characteristic of each pixel obtained as above. FIG. 6 is a flowchart showing an action of the data processing apparatus 100.

As shown in FIG. 6, first, the measurement condition is input into the data processing apparatus 100 (step T1). Then, the characteristic prepared preliminarily for each pixel and the approximate formula obtained under the measurement condition are fitted to the X-ray intensity data (step T2). Thereby, the correction coefficient of each pixel is obtained for the Flat-Field correction.

Next, it is determined whether or not each pixel is to be set as the complementary pixel (step T3). For example, the determination is performed depending on whether or not the noise distribution overlaps the energy range not smaller than the threshold value. In this case, when the noise overlaps the threshold value, the information of this pixel cannot be used and therefore it is determined that the complementary pixel setting is to be performed.

In this manner, when the complementary pixel setting is determined to be performed, the X-ray intensity of this pixel is not taken and the correction table is set so as to complement this pixel with surrounding pixels (step T4). When the complementary pixel setting is determined not to be performed, the process proceeds to step T5. Then, the X-ray intensity is corrected by the use of the obtained correction table (step T5). Here, it becomes possible to perform the action as above by causing the apparatus to execute a program.

(Outline of a Correction Method)

Figure 7:
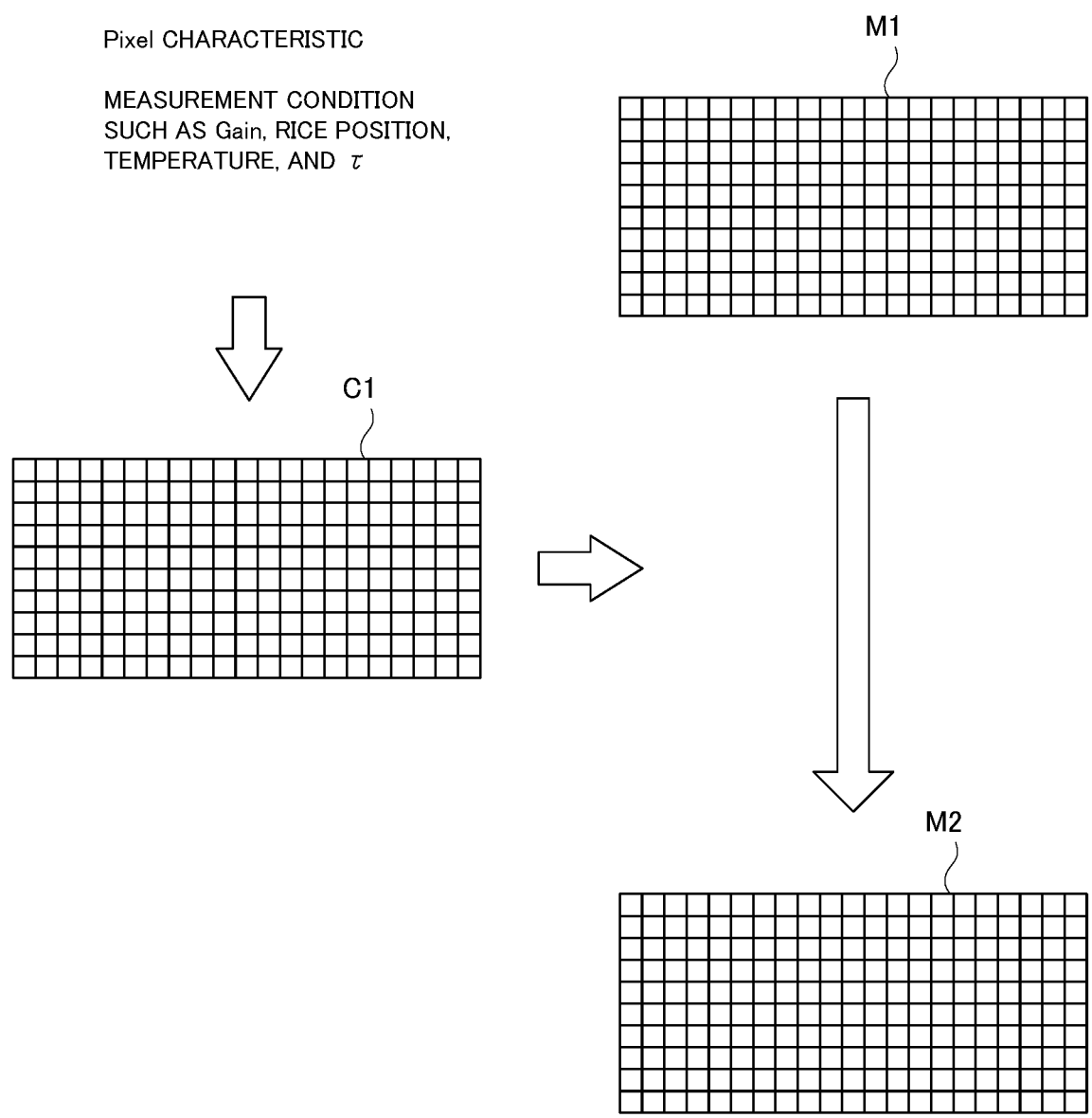
FIG. 7 is a schematic diagram showing a correction method using a data processing apparatus of the present invention.

FIG. 7 is a schematic diagram showing a correction method using the data processing apparatus. As shown in FIG. 7, the approximate formula expressing the count value of each pixel in the detector is calculated by the use of the characteristic of each pixel and the measurement condition in the measurement by the detector such as a gain, a RICE position, temperature, τ (time constant of count omission), or the like. Then, the correction table C1 is generated for the detector by the fitting of the approximate formula to the X-ray intensity. Then, it becomes possible to correct the X-ray intensity data M1 measured by the detector using the generated correction table C1 and to obtain corrected data M2.

(Fitting)

Figure 8:
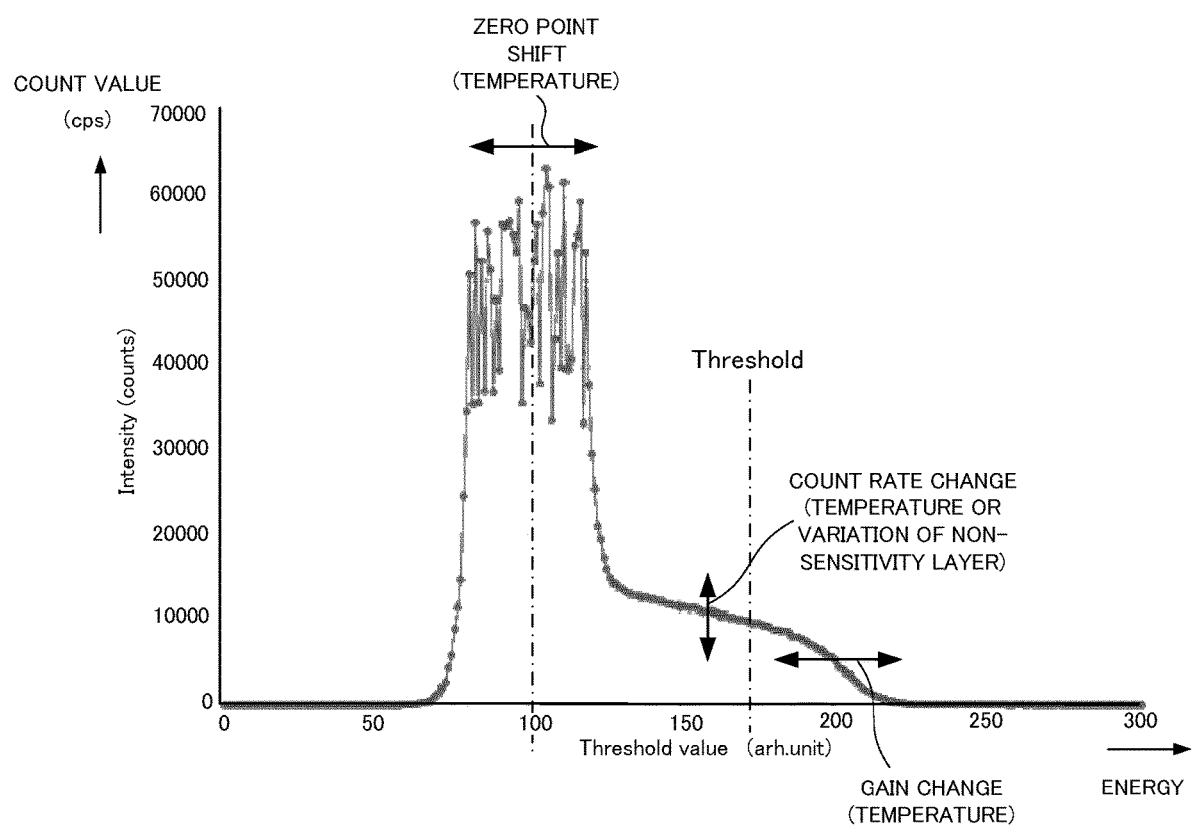
FIG. 8 is a graph showing an obtained integral profile.

In the following, there will be explained the fitting when the correction coefficient is calculated by the use of the approximate formula. FIG. 8 is a graph showing an obtained integral profile. As shown in FIG. 8, the integral profile is shifted by temperature, variation of non-sensitivity layer thickness of the detector, the kind of the X-ray source, or the like. For example, the zero point is shifted by the temperature, the counting rate is changed by the temperature or the variation of the non-sensitivity layer thickness, and the gain is changed by the temperature. Further, the integral profile can be affected by atmospheric pressure, humidity, or the like. For example, since the change of the atmospheric pressure changes the absorption rate of the X-ray from the X-ray source to the detector, the count intensity decreases when the atmospheric pressure is higher and the count intensity increases when the atmospheric pressure is lower.

Figure 9:
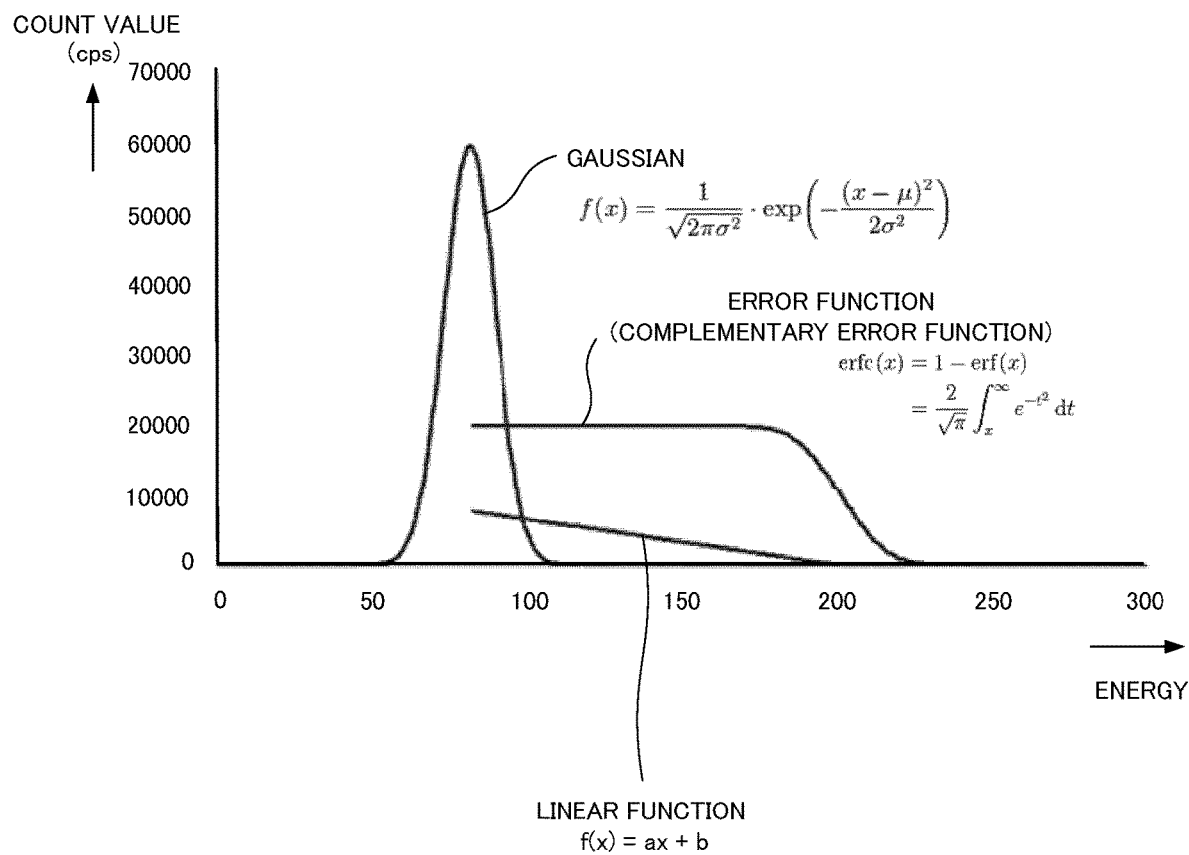
FIG. 9 is a graph showing each term of an approximate formula.

The integral profile like this is expressed by the approximate formula. FIG. 9 is a graph showing each term of the approximate formula. For example, the count amount by the noise can be approximated by a Gaussian function as shown in Formula (1). Further, in the primary count amount by the X-ray irradiation, the count amount by other than the noise can be approximated by an error function (complementary error function) as shown in Formula (2). Further, the count amount by the charge sharing can be approximated by a linear function shown in Formula (3). Note that the above formulas are representative examples and the formulas expressing the respective count amounts are not always limited to these formulas.

[Formula 1]

$$f(x) = \frac{1}{\sqrt{2\pi\sigma^2}} \cdot \exp\left(-\frac{(x-\mu)^2}{2\sigma^2}\right) \tag{1}$$

[Formula 2]

$$\operatorname{erfc}(x) = 1 - \operatorname{erf}(x) \tag{2}$$

$$= \frac{2}{\sqrt{\pi}} \int_x^\infty e^{-t^2} dt$$

[Formula 3]

$$f(x) = -ax + b \tag{3}$$

For example, the primary count amount by the X-ray irradiation can be expressed as shown in Formula (4) by the use of Formulas (2) and (3). In this case, the detection amount generated by the charge sharing is evaluated as a linear function of a difference between a peak energy on the high energy side and a target energy. Here, the target energy means an energy for which a detection amount generated by the charge sharing is to be calculated.

[Formula 4]

$$I(E) = \left(1 - \operatorname{erf}\left(\frac{E - E_{peak}}{\sqrt{2}\,\sigma}\right)\right) \times (A + B(E - E_{peak})) \tag{4}$$

I(E): Intensity of the X-ray profile at a certain energy threshold value E

A and B: Real constant determined by the X-ray intensity and the like $E_{peak}$: Primary peak energy not affected by the charge share It is also possible to express the primary count amount by the X-ray irradiation as shown in Formula (5) by overlapping diffraction data supposed to be detected by the charge sharing of diffraction data on the high energy side for each pixel in the X-ray detector and thereby evaluating the charge sharing. By the calculation of the detection amount generated by the charge sharing in this manner, not only accurate evaluation is obtained but also an effect of reproducing an X-ray profile shape by the charge share is obtained without depending on a pixel shape or the like.

[Formula 5]

$$I(E) = A \int_0^{E_{peak}} p_{CS}(E_{CS}) \Delta S \left(1 - \text{erf}\left(\frac{E - E_{CS}}{\sqrt{2}\,\sigma}\right)\right) dE_{CS} +$$
$$B\left(1 - \text{erf}\left(\frac{E - E_{peak}}{\sqrt{2}\,\sigma}\right)\right) + C \quad (5)$$

Figure 10:
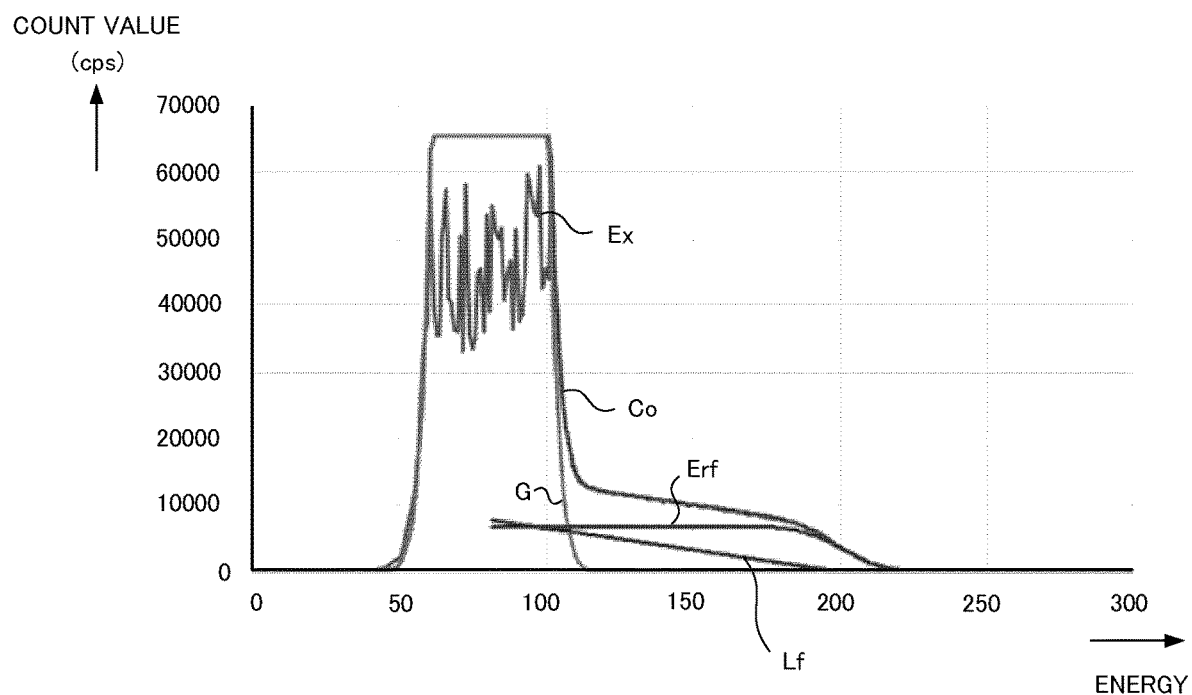
FIG. 10 is a graph showing a result of fitting an approximate formula to an integral profile.

I(E): Intensity of the X-ray profile at a certain energy threshold value E
A, B, and C: Real constant determined by the X-ray intensity and the like
$E_{peak}$: Primary peak energy not affected by the charge share
$E_{cs}$: Apparent energy generated by the charge share
$p_{cs}(E_{cs})$: Probability of collecting charge corresponding to $E_{cs}$ in a target pixel
ΔS: Area of a region where apparent energy by the charge share changes by ΔE FIG. 10 is a graph showing a result of the fitting of the approximate formula to the integral profile. As shown in FIG. 10, it is possible to fit an approximate formula profile Co obtained by adding a Gaussian function G, an error function Erf, and a linear function Lf, to a profile Ex of an experimental result. The correction coefficient is obtained from a coefficient obtained at this time, and the correction table can be generated.

(Noise Handling)

Figure 11:
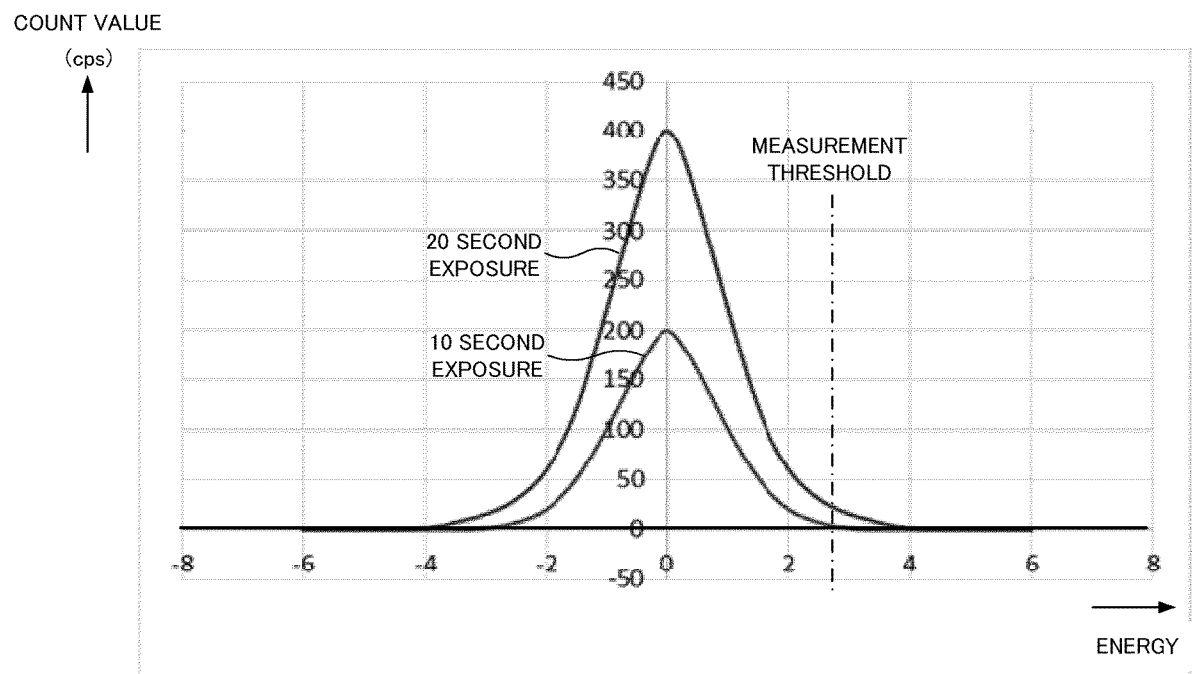
FIG. 11 is a graph showing an example of a noise integral profile.

In the following, noise handling will be explained. FIG. 11 is a graph showing an example of the noise integral profile. As shown in FIG. 11, even a threshold value set at a position not affected by the noise (edge of a skirt) in the case of 10 second exposure falls in the affected range in the case of the noise of 20 second exposure. In this manner, the pixel becomes a target of the complementary pixel setting depending on the threshold value position.

Figure 12:
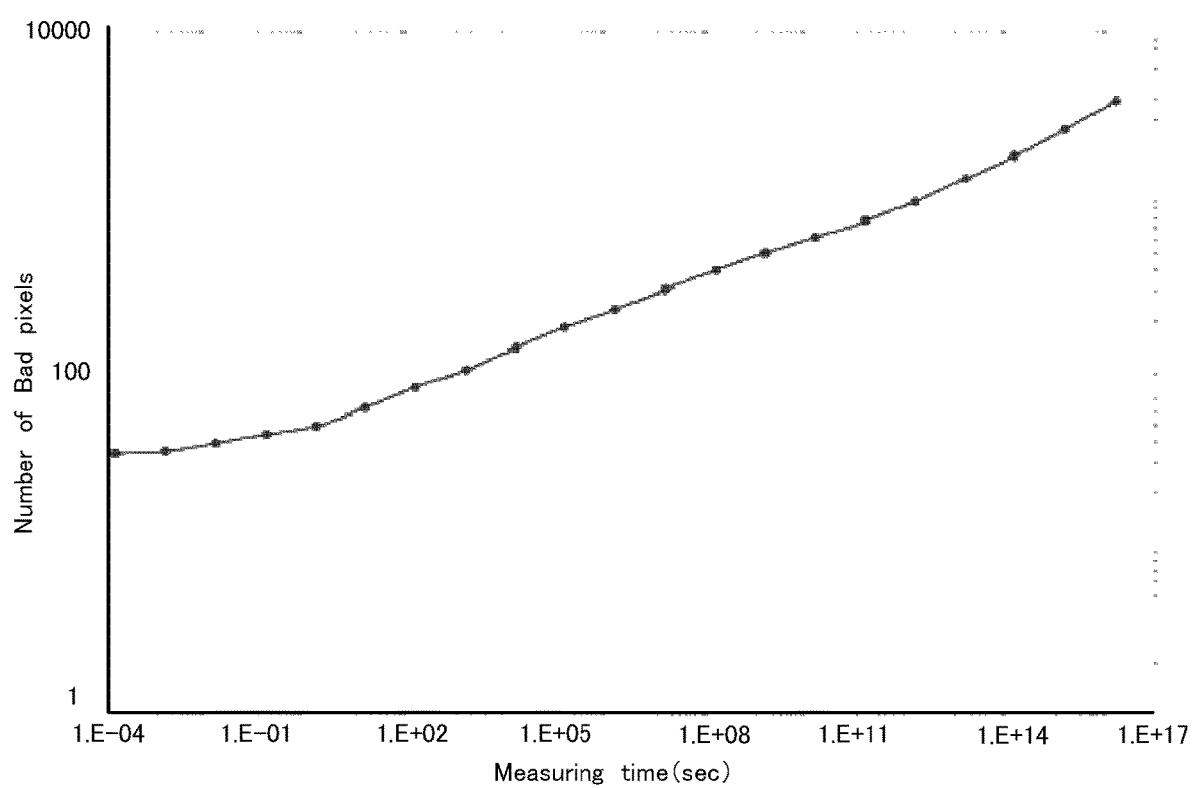
FIG. 12 is a graph showing the number of bad pixels with respect to a measurement time.
Figure 13:
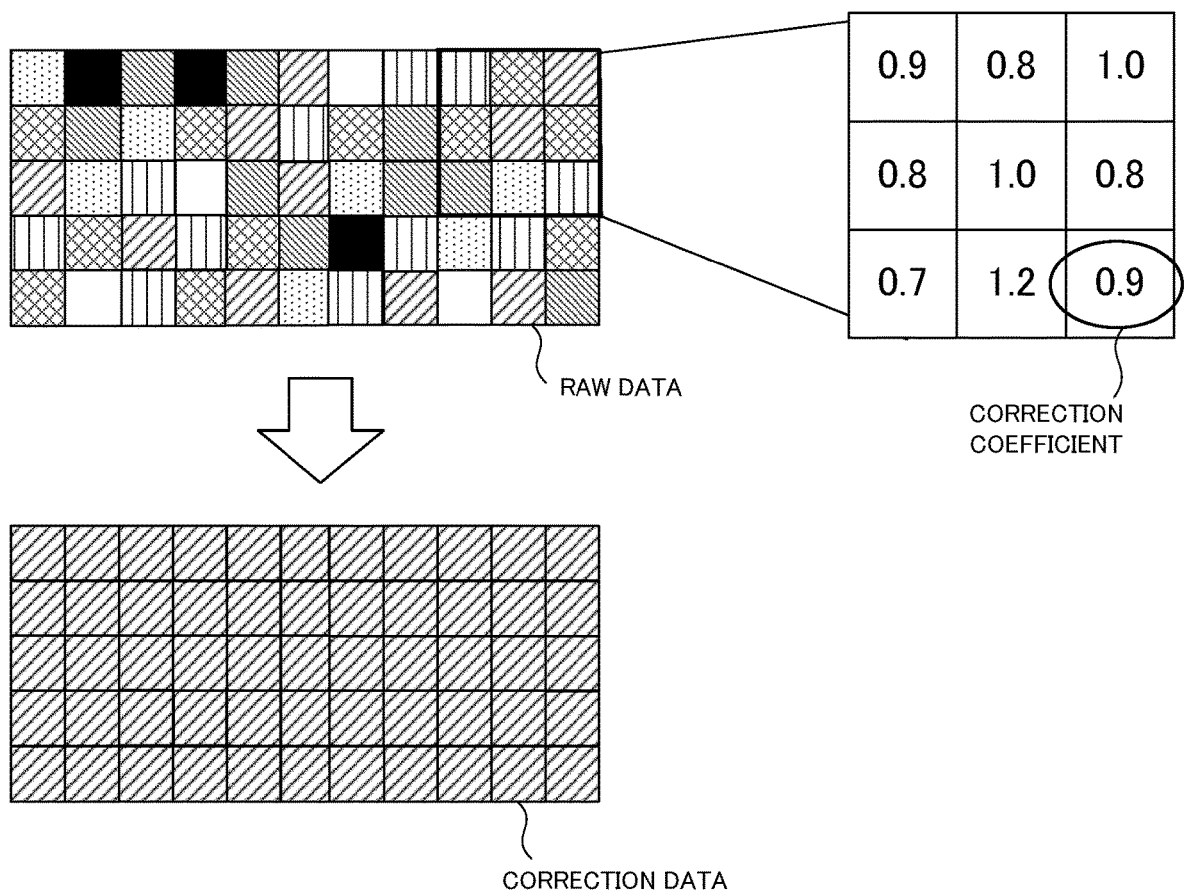
FIG. 13 is a diagram schematically showing an example of a correction table for Flat-Field correction.
Figure 14:
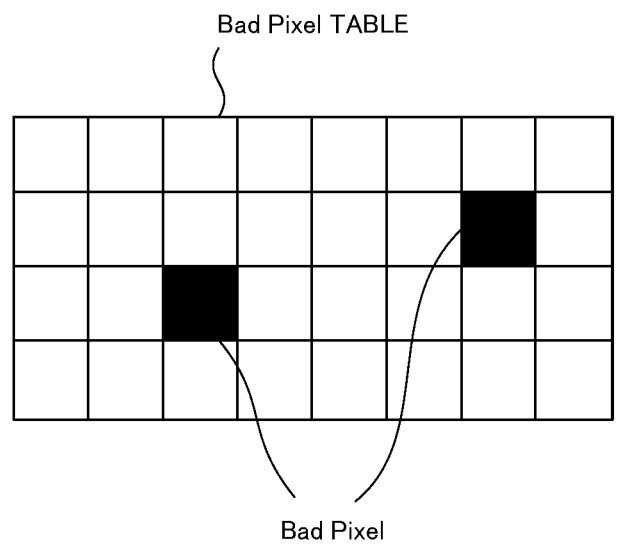
FIG. 14 is a diagram schematically showing an example of a correction table for correction of eliminating a bad pixel.
Figure 14:
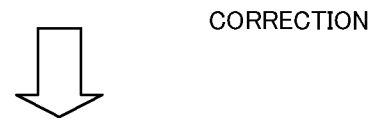
Figure 14:
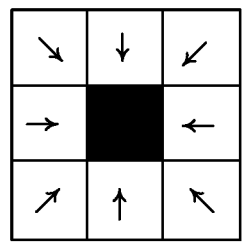

FIG. 12 is a graph showing the number of bad pixels with respect to a measurement time. As the exposure time is increased as described above, even the threshold value of the same position overlaps the noise profile. As shown in FIG. 12, while the number of bad pixels is increased as the measurement time increases, it is possible to provide a correction table to complement the increased bad pixels.

DESCRIPTION OF SYMBOLS

100 Data processing apparatus
110 Measurement condition storage unit
120 Correction table generation unit
130 Characteristic storage unit
140 Approximate formula storage unit
150 Measurement data storage unit
160 Correction unit
170 Output unit
210 Diffusion plate
220 Detector
B1 X-ray beam
C1 Correction table
Co Approximate formula profile
Erf Error function
Ex Experimental result profile
G Gaussian function
Lf Linear function
M1 X-ray intensity data
M2 Corrected data

The invention claimed is:

1. A data processing apparatus that corrects X-ray intensity data measured by a pixel detector, comprising:
a characteristic storage unit to store a characteristic of each pixel in a specific detector;
a correction table generation unit to apply a measurement condition input as a desired measurement condition in measurement by the specific detector, and a value expressing the characteristic of each pixel to an approximate formula expressing a count value of the each pixel and to generate a correction table for the specific detector using a calculation result of the approximate formula, the value expressing the characteristic of each pixel being obtained as a result of uniformly diffused X-ray irradiation performed under measurement conditions at a time of preliminary preparation; and
a correction unit to correct X-ray intensity data using the generated correction table, the X-ray intensity data being measured by the specific detector under the input measurement condition.

2. The data processing apparatus according to claim 1, wherein
the correction table generation unit uses a formula obtained by adding a formula expressing a primary count amount by X-ray irradiation and a formula expressing a count amount by charge sharing, as the approximate formula expressing the count value of each pixel.

3. The data processing apparatus according to claim 2, wherein
the correction table generation unit uses a formula obtained by adding a formula expressing a count amount by noise and a formula expressing a count amount by other than the noise, as the approximate formula expressing the primary count amount by the X-ray irradiation.

4. The data processing apparatus according to claim 1, wherein
the correction table generation unit calculates a correction coefficient for Flat-Field correction or distortion correction for each pixel using a calculation result of the approximate formula expressing the count value of each pixel.

5. The data processing apparatus according to claim 1, wherein
the correction table generation unit specifies a bad pixel using a calculation result of the approximate formula expressing the count value of each pixel and a threshold value of the count value, and calculates a correction coefficient for complementing the bad pixel.

6. The data processing apparatus according to claim 1, wherein
the input measurement condition in the measurement includes temperature around a measurement apparatus.

7. The data processing apparatus according to claim 1, wherein
the input measurement condition in the measurement includes a kind of an X-ray source used for the measurement.

8. A method of obtaining the characteristic of each pixel stored in the data processing apparatus according to claim 1, comprising the steps of:
uniformly irradiating the specific detector with an X-ray while changing a specific measurement condition, and recording a detection value of each pixel; and
calculating a characteristic of each pixel from the recorded detection value of each pixel.

9. A method of data processing for correcting X-ray intensity data measured by a pixel detector, comprising the steps of:
applying a measurement condition input as a desired measurement condition in measurement by a specific detector and a preliminarily stored value expressing a characteristic of each pixel in the specific detector to an approximate formula expressing a count value of the each pixel and generating a correction table for the specific detector using a calculation result of the approximate formula expressing the count value of each pixel, the value expressing the characteristic of each pixel being obtained as a result of uniformly diffused X-ray irradiation performed under measurement conditions at a time of preliminary preparation; and
correcting X-ray intensity data using the generated correction table, the X-ray intensity data being measured by the specific detector under the input measurement condition.

10. A computer readable non-transitory storage medium to store a program of data processing program for correcting X-ray intensity data measured by a pixel detector, the program causing a computer to execute processing comprising:
applying a measurement condition input as a desired measurement condition in measurement by a specific detector and a preliminarily stored value expressing a characteristic of each pixel in the specific detector to an approximate formula expressing a count value of the each pixel and generating a correction table for the specific detector using a calculation result of the approximate formula expressing the count value of each pixel, the value expressing the characteristic of each pixel being obtained as a result of uniformly diffused X-ray irradiation performed under measurement conditions at a time of preliminary preparation; and
correcting X-ray intensity data using the generated correction table, the X-ray intensity data being measured by the specific detector under the input measurement condition.

* * * * *